R. MULHOLLAND.
Torsion Spring.
No. 230,327.   Patented July 20, 1880.
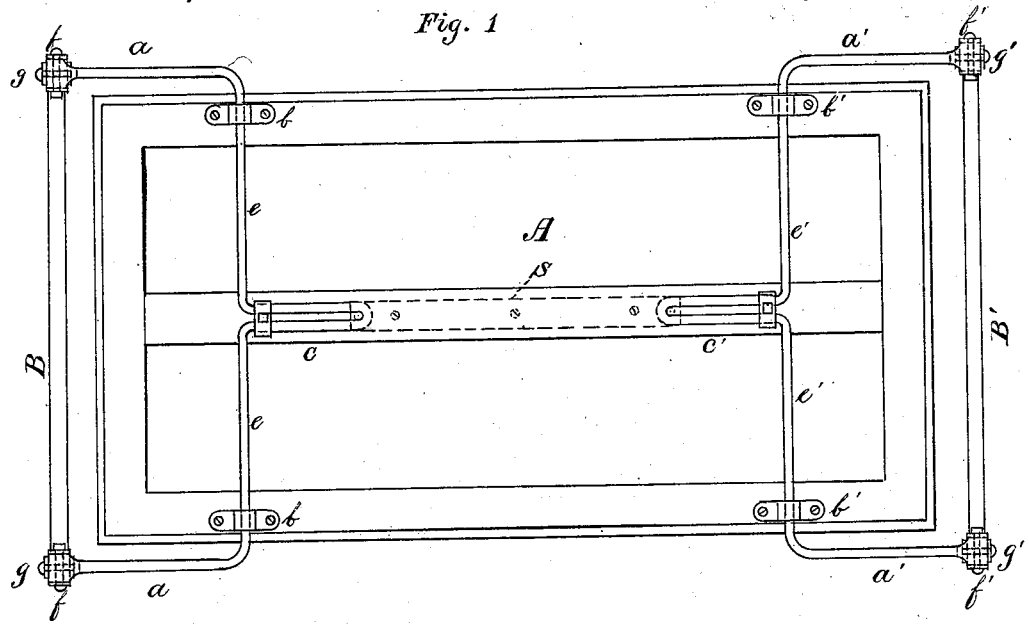
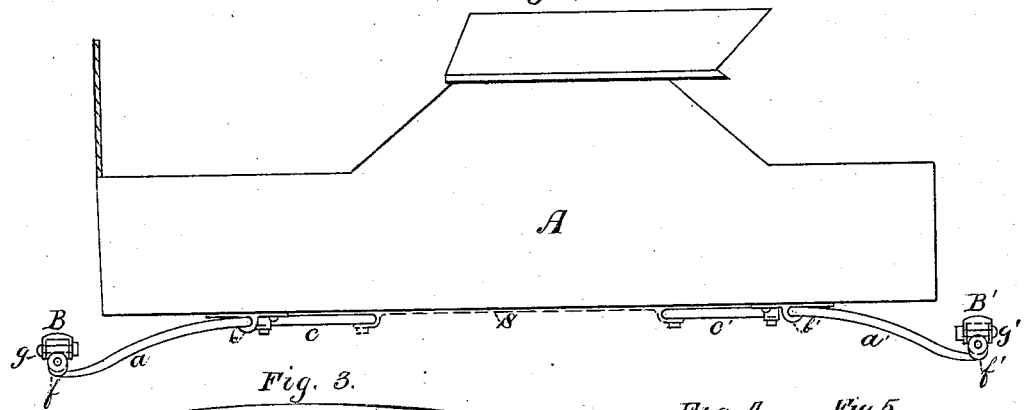
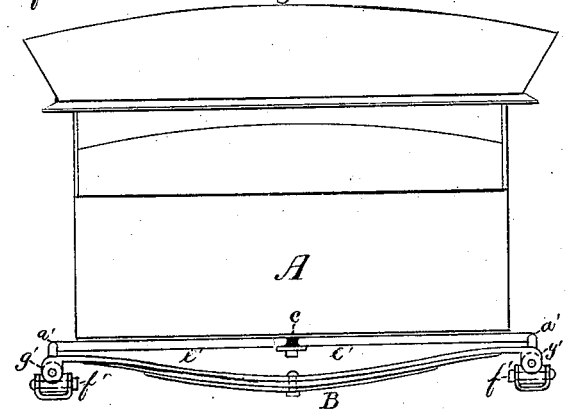
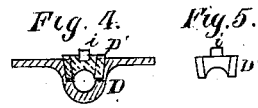
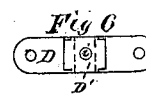
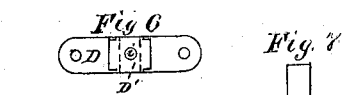
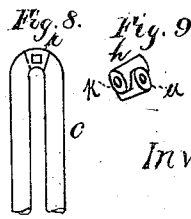
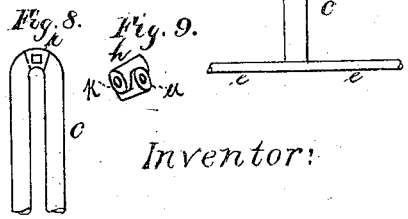
Witnesses:
Julien T. Williams
Wm. Harkins.
Inventor:
Richard Mulholland

United States Patent Office.

RICHARD MULHOLLAND, OF DUNKIRK, NEW YORK.

TORSION-SPRING.

SPECIFICATION forming part of Letters Patent No. 230,327, dated July 20, 1880.

Application filed December 17, 1879.

*To all whom it may concern:*

Be it known that I, RICHARD MULHOLLAND, of Dunkirk, in the county of Chautauqua and State of New York, have invented certain new and useful Improvements in Torsion-Springs for Vehicles, of which the following is a full, clear, and exact description, reference being had to the accompanying drawings and letters of reference marked thereon, in which similar letters of reference indicate like parts.

Figure 1 is a view of the under side of a vehicle with the springs attached. Fig. 2 is a side view, and Fig. 3 an end view, of the same. Figs. 4, 5, and 6 are detail enlarged views of the boxes $b\ b\ b'\ b'$. Figs. 7 and 8 show different methods of constructing the torsion-springs. Fig. 9 is a perspective view of the double-coupler device used for connecting the torsion with the semi-elliptic springs.

My improvement consists in a novel construction and arrangement of torsion-springs in connection with the body and running-gear of a vehicle in such a manner as to admit of their being used in combination with suitable leaf semi-elliptic springs, and in other respects hereinafter mentioned.

It is well known that the use of side bars on vehicles has for its principal object the hanging or suspending of the body lower down than has heretofore been conveniently done without their use; but more or less objection is found in the sagging or bending down of the bars when in use, and much inconvenience and difficulty are met with in turning the vehicle around, caused by the extra width of the bars being added thereto. Therefore the object of my invention is to furnish a spring that, by hanging the body low, shall possess the best features of the side-bar vehicle, and, while simple and cheap in construction, shall be free from the objections to the use of side bars on vehicles.

The construction and operation of my invention are as follows:

In the drawings, Fig. 1, A is the body of a vehicle, of any suitable construction. $a\ e\ c\ a'\ e'\ c'$ are the torsion-springs. These are made, as shown, of a single continuous rod or bar. They may also be made of two rods or bars suitably secured by means of bolts or otherwise, as shown in Fig. 8, or a solid arm, $c$, Fig. 7, may be welded or formed to a continuous rod or bar, $e\ c$, as shown. The arms $c\ c'$, Fig. 1, may be pointed outward instead of inward, as shown.

The lever-arms $a\ a'$ are bent from the main shank of the springs $e\ e'$ at right angles, or thereabout, with an inclination downward.

The outer extremities of the springs $a\ e\ c\ a'\ e'\ c'$—namely, $f\ f'$—are flattened, and have solid ears or shackle-heads formed on their inner and outer edges, (preferably borne on their upper surface,) to provide for their pivotal attachment to the lower part, $u$, of the double coupler $h$, Fig. 9, by which the said springs are connected with the semi-elliptic springs B B', as shown at $g\ g'$.

The inner arm or arms, $c\ c'$, Fig. 1, are bent from the main shanks of the springs $e\ e'$, at about right angles, in a loop or approximate shape, of any proper dimensions, and at any distance between the arms $a\ a\ a'\ a'$; but two rods or bars may be used in the formation of each spring, as above described, or a single continuous rod or bar may be welded or formed to a solid arm. Said arms are the media of rigid attachment to the body of the vehicle, and they must be of sufficient length and width to form a firm bearing to prevent their loosening from the body by the twisting action of that portion of the springs which is subject to torsion. They may also be made long enough to meet each other. They are rigidly secured to the body A by means of bolts, clips, or other suitable fastenings. If necessary to make more secure, a connecting-strap, S, may be used, as shown by dotted lines, Fig. 1.

The twisting portions of the springs $e\ e\ e'\ e'$ are secured to the body A by means of journals or boxes $b\ b\ b'\ b'$, having brass or other suitable bearings, which hold the springs in their proper position, but allow them to turn or twist under the action of the load.

Fig. 4 shows an enlarged vertical longitudinal section of one of the boxes $b\ b'$, which is made in two parts. D is the lower part of the box, which is journaled on its upper inside surface to fit one half the spring at the point where the boxes are attached to the body. D' shows the cap or upper part, journaled on its lower surface to also fit one half the spring in like manner.

On the top surface of cap D' a recess is made, into which a piece of rubber, i, is inserted, which projects above its face. The springs are fitted to the boxes so as to leave a small space between the lower part, D, and the top or cap D', where they meet in the center.

The boxes b b', Fig. 1, are secured to the body A by means of bolts. As they are drawn up to their places the rubbers i, coming in contact with the body, press the caps D' of said boxes downward, bringing the top and lower sections of the boxes to their places on the springs.

As the boxes wear from the action of the springs the pressure of the said rubbers forces the upper and lower sections of the boxes closer together, causing them to always fit the springs closely, thereby rendering their action comparatively noiseless.

Fig. 5 is a side view of the cap D', Fig. 4, detached from the box. i is the rubber. Fig. 6 shows a top view of the box, with the cap D' and the rubber i in their places.

The semi-elliptic springs B B' are made with solid ears or shackle-heads formed on their inner and outer edges at their ends, (preferably borne on their under surface, as shown,) to provide for their pivotal connection with the upper part, k, of the double coupler h, Fig. 9, as shown at g g'. They are rigidly attached longitudinally at or near their centers, in the usual or any suitable manner, to a head-block of the vehicle in front and to the hind bed-piece and axle behind. The said springs B B' may be dispensed with and the torsion-springs connected in any suitable manner to the head-block of the vehicle in front and to the axle or its equivalent behind.

The construction being substantially as specified, the operation of the torsion and semi-elliptic springs when in action under a load will be as follows: The arms a a' of the torsion-springs, being pivoted to the double coupler, rotate at f f', which compensates for any change in their position from the torsion of the springs and the action of the body downward and upward. The semi-elliptic springs B B', being also pivoted transversely to the said coupler at g g', are free to lengthen and shorten as they change their curves, and to adjust themselves to the action of the torsion-springs, thus enabling the latter to be made shorter, lighter, and cheaper than without the use of semi-elliptic springs.

I do not claim a torsion-spring bent in the form of a quadrilateral or equivalent figure, nor a box with caps secured by clips or bolts for torsion-springs, or inclosing cushions of rubber, leather, or other material, substantially as described and shown, and for the purpose set forth in Brace's patent; nor any combination of a torsion-spring with a semi-elliptic or similar spring secured to the body of a vehicle; but,

Having thus described my invention, I claim and desire to secure by Letters Patent—

1. The combination, with the body and running-gear of a vehicle, of the within-described torsion-springs a e c a' c' c', the arms a a' having ears or shackle-heads and provided at their extremities with the double coupler h, substantially as specified.

2. The rubber i, in combination with the body of a vehicle and the cap D' of a torsion-spring box having metallic bearings, whereby the pressure of the rubber i inserted into and projecting above the top of cap D' and pressing against the bottom of the body A causes the top and lower sections of the box to fit the spring closely and compensate for the loss by wear of the same, substantially as specified.

3. The torsion-springs a e c a' c' c', in combination with the double coupler h and the transverse semi-elliptic leaf-springs B B', the latter rigidly attached to the head-block at the front and to the hind bed-piece and axle at the rear, substantially as shown and described.

4. The strap S, in combination with the body of a vehicle and the within-described torsion-springs, substantially as shown and described.

5. In a vehicle, the double coupler h, in combination with a torsion-spring and a semi-elliptic spring, substantially as shown and described, and for the purpose set forth.

RICHARD MULHOLLAND.

Witnesses:
JULIEN T. WILLIAMS,
WM. HARKINS.